Aug. 14, 1945.                 C. W. BERTHIEZ                    2,382,392
            RAIL CLAMPING DEVICE FOR PLANERS AND THE LIKE
                    Filed Oct. 16, 1941              4 Sheets-Sheet 1
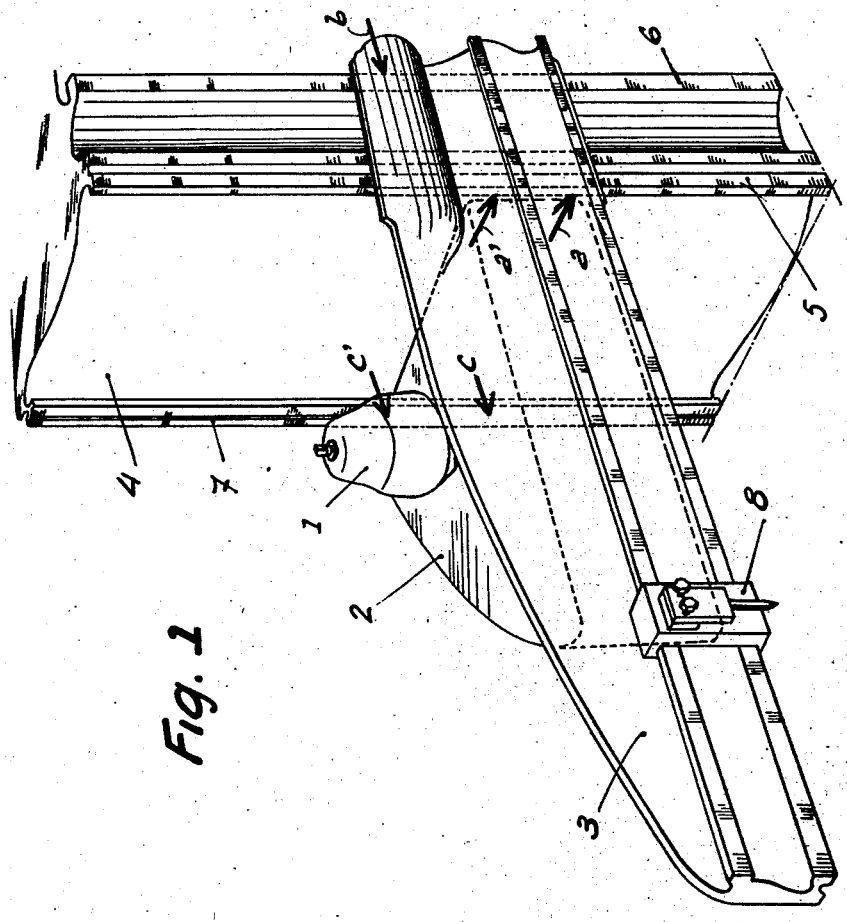
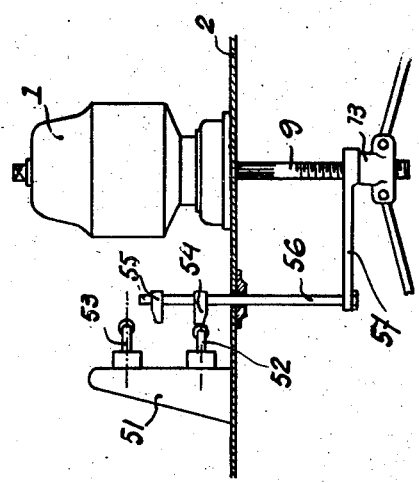
INVENTOR
Charles William Berthiez
BY George H. Corey
ATTORNEY Aug. 14, 1945. C. W. BERTHIEZ 2,382,392
RAIL CLAMPING DEVICE FOR PLANERS AND THE LIKE
Filed Oct. 16, 1941 4 Sheets-Sheet 3

INVENTOR
Charles William Berthiez
BY George H. Corey
ATTORNEY

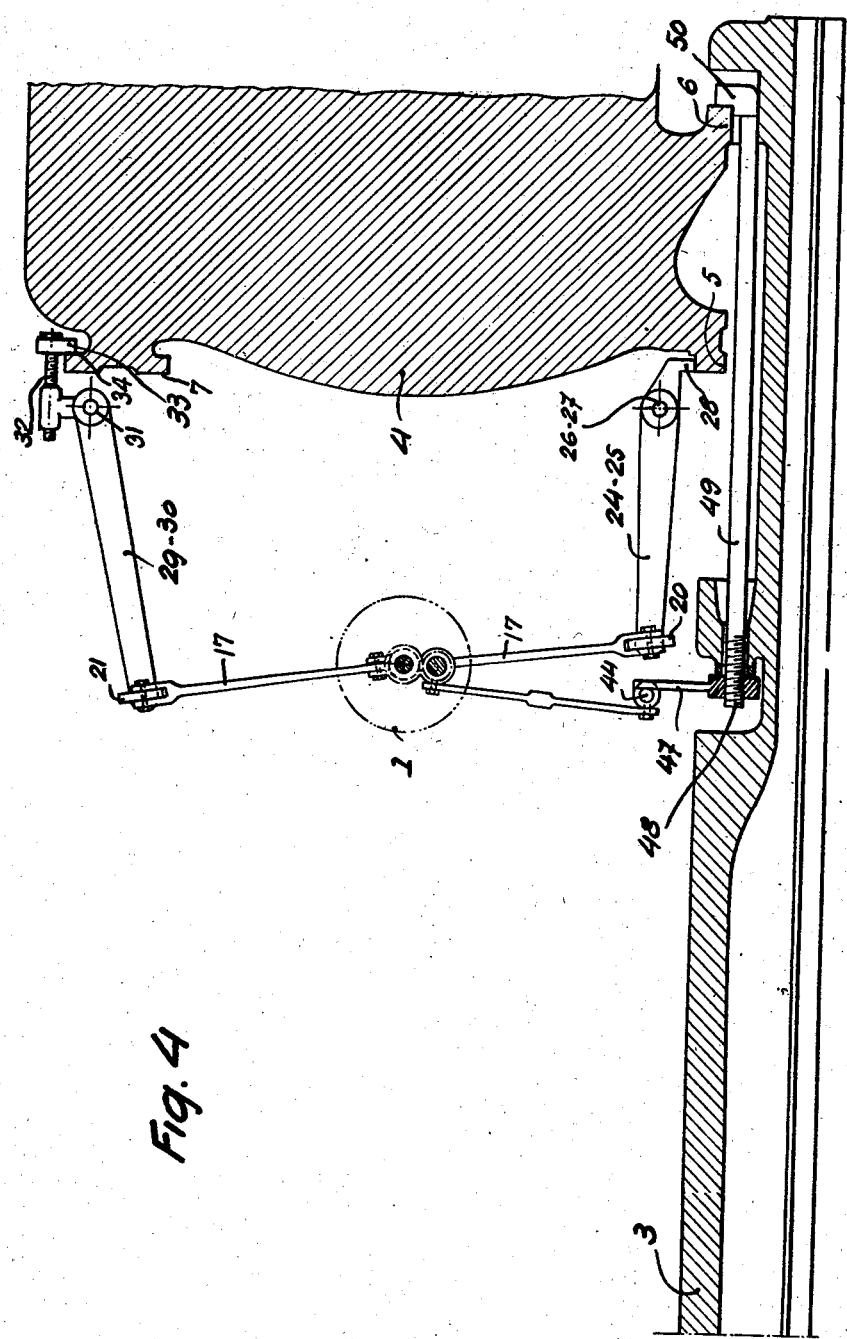

Patented Aug. 14, 1945

2,382,392

UNITED STATES PATENT OFFICE 2,382,392

RAIL CLAMPING DEVICE FOR PLANERS AND THE LIKE

Charles William Berthiez, Paris, France; vested in the Alien Property Custodian

Application October 16, 1941, Serial No. 415,230
In France December 4, 1940

20 Claims. (Cl. 90—38)

This invention relates to improvements in rail clamping devices for planers and other similar machines.

Such machines, including radial drills, single pillar vertical lathes, single pillar planers and the like, comprise a column along which a horizontal projecting arm can slide. In this arrangement there is a more or less marked drop of the end of the arm below the horizontal, due to the clearance it is necessary to provide in order that the arm may be slidable along the column or pillar.

In said machines, the clamping of the arm onto the pillar is generally ensured by systems involving nuts which when tightened by the operator one after another are unavoidably non-uniformly tightened and equalized. The result is that the arm does not remain strictly horizontal from one operation to another.

The object of the present invention is to cope with this difficulty, by providing means to re-establish the horizontality of the arm prior to the clamping of the arm on the pillar whereby an invariably identical clamping of the arm from one operation to another is assured. In this way, the machine to which the present invention is applied will be enabled to execute the operations it is intended to perform with a strict accuracy previously impossible to attain.

The invention involves a method making it possible to obtain the results indicated hereinbefore, by eliminating all clearance between said two members of the machine when the arm has been adjusted along the pillar, by creating bearing points between the horizontal arm and its square bracket, on the one hand, and the rear or side faces of the guiding devices or slides, on the other hand. Preferably, five such bearing points are created, three for the arm proper and two for its square bracket, said bearing points being selected so as to provide perfect stability of the tool-holder horizontal arm.

According to the invention, the tightening on the bearing point by which the realignment of the arm is ensured is carried out before the tightening up on the other bearing points is carried out and by reason of which clamping of the arm in position is produced.

The invention further involves a device for carrying the foregoing method into effect, which device is fundamentally characterized by the fact that once the arm has reached the position it is intended to occupy on the vertical pillar a motor starts and applies force against certain points of the slides, studs or heel pieces which acts to temporarily eliminate the sliding clearance between the horizontal arm and the vertical pillar and clamp the arm onto the pillar.

The clamping device is further characterized by the fact that there is interposed between the motor controlling the horizontalizing and the locking actions and the studs pressing against the slides, a series of operating links and rocking levers, as well as springs, the mounting load of which determines the magnitude of the pressures applied to the bearing points of the aforesaid studs on the slides.

In the attached drawings application to a single pillar planer is shown in diagram form and merely as an example.

In the drawings:

Figure 1 is a view in perspective of a fragment the vertical pillar of a planer having mounted thereon a horizontal arm provided with a horizontalizing and clamping device according to the invention.

Figure 4 is a horizontal section, and,

Figure 5 is a detailed view showing the contact-making device by means of which the horizontalizing and clamping device can be stopped after having operated in one direction or the other.

Figure 2:
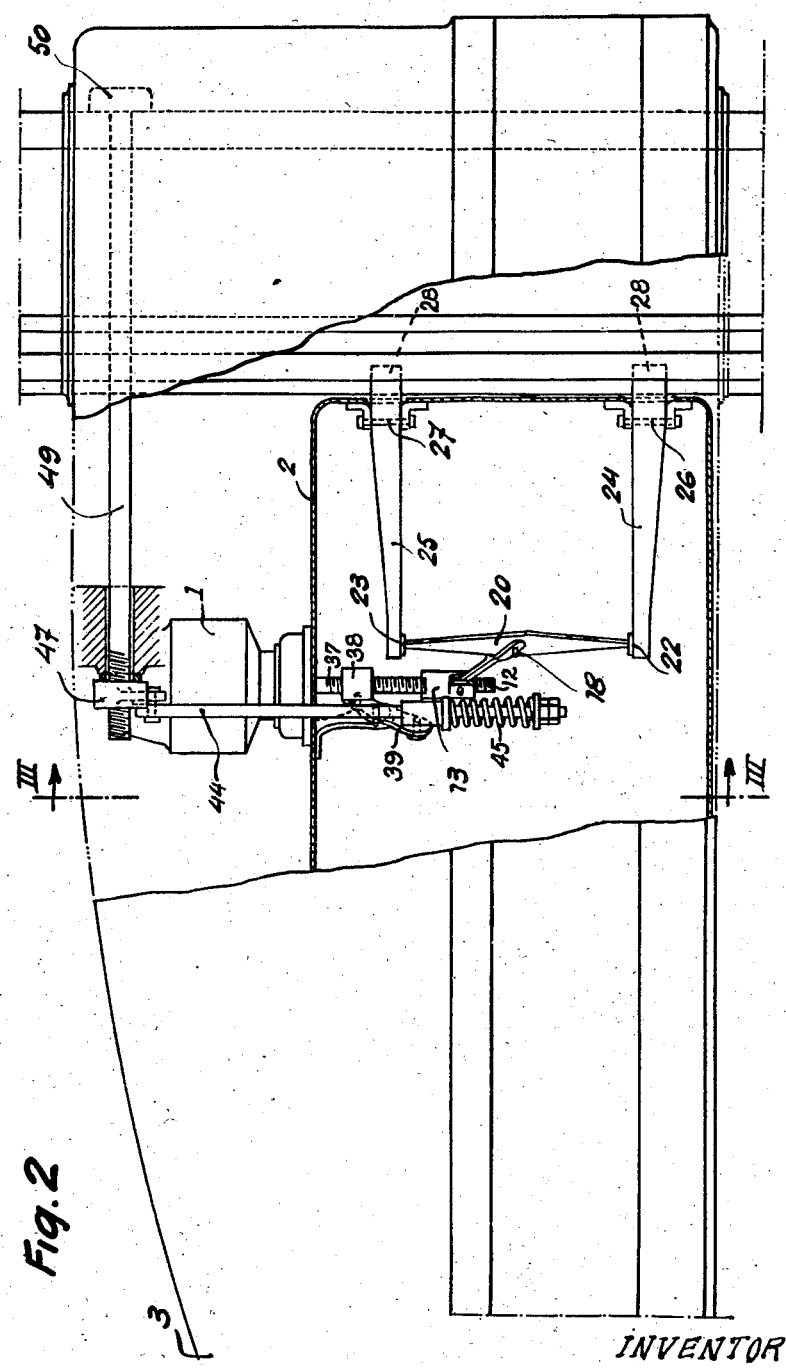
Figure 2 is a fragmentary front elevation on an enlarged scale of the device shown in Fig. 1, partially cut away.

The horizontalizing and locking device comprises a motor 1 mounted on square bracket 2 of horizontal arm 3 which is capable of sliding vertically along pillar 4 of the planer. In the example shown, said pillar is provided with slides 5 and 6 for arm 3 and slide 7 for square bracket 2. Tool-holder 8 is slidingly mounted on horizontal arm 3.

The purpose of the present invention is attained by providing between horizontal arm 3 and its square bracket 2 on the one hand, and vertical pillar 4 on the other hand, a powerful grip at a certain number of judiciously selected points in order to ensure, when the horizontal arm has been brought to a selected position along pillar 4, firstly the horizontality of said arm and then the clamping of said arm in the required position.

The clamping bearing-points selected in the example illustrated are indicated by arrows in Figure 1. As will be observed, for horizontal arm 3 proper, there are two bearing points *a* and *a'* on the rear portion of slide 5, and one bearing point b on the side portion of slide 6. For square bracket 2, two bearing points c and c' are provided on the rear portion of slide 7. The alignment of the arm is ensured by means of a bearing point b and the clamping of the arm in its horizontal position is ensured in a uniform manner by means of bearing points a, a', c, c'.

Figure 3:
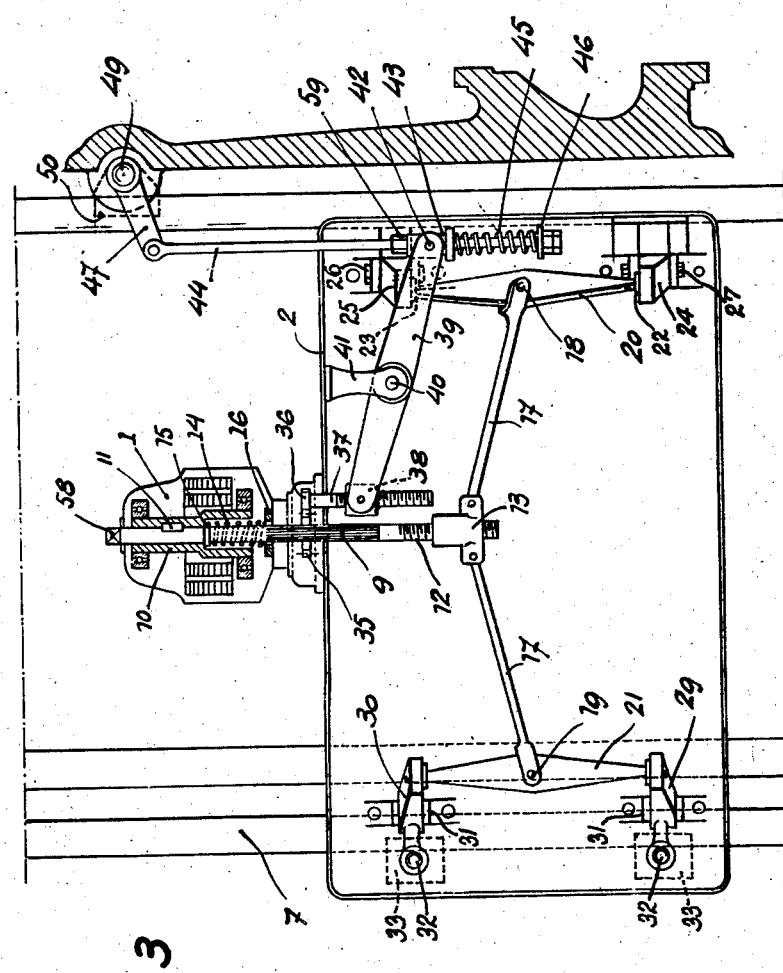
Figure 3 is a transverse section taken along the line III—III of Fig. 2.

The actuating motor 1 which operates to horizontalize and clamp arm 3 and its square bracket, comprises a rotor which is drilled to allow a spindle 9 to pass through it. The spindle is driven by a hollow shaft 10 of the rotor, by means of a key or spline 11. The end of said spindle 9 is threaded at point 12 (refer to Fig. 3) and screws into a yoke 13. Said spindle 9 is capable of vertical movement by compressing a spring 14 positioned between a shoulder 15 of spindle 9 and a ring 16 integral with the casing of the motor, said spline permitting movement of spindle 9 within the hollow shaft 10.

For the purpose of ensuring alignment of the arm 3 and the clamping of its upper portion against the edge of the slide, as indicated by arrow b in Fig. 1, the following arrangement is employed:

Spindle 9 which passes through the rotor of motor 1 is splined along a certain portion of its length (refer to Fig. 3) in order that said spindle may be capable of longitudinal movement while rotationally actuating a gearwheel 35 which meshes with a gear-wheel 36 fixed to a screw 37. Said screw 37 screws into a nut 38 articulated by means of a fork to a counter-motion lever 39; said counter-motion lever is capable of rotation about an axis 40 mounted, for instance, by means of a stirrup 41, on square bracket 2. The other end of lever 39 is connected, by means of pin 42, to a sleeve 43 slidingly mounted on rod 44. A spring 45 is interposed between sleeve 43 and a washer 46 secured to the lower end of rod 44 (refer to Figures 3 and 4). The upper end of rod 44 is connected as a link to arm 47 provided with a hub threaded onto the threaded end 48 of a rod 49 the other end of which is provided with a heelpiece 50 capable of bearing against the side face of slide 6 (refer to Fig. 4 and arrow b of Fig. 1).

In order to ensure uniform clamping of all four bearing points a, a', and c, c', the following arrangement is employed:

To yoke 13 are coupled two links 17 the free ends of which are pivotally connected by pins 18 and 19 to rocking levers 20 and 21.

Each end of rocking lever 20 is in turn articulated at 22 and 23 to the long arm of straight levers 24 and 25 (refer to Fig. 2), which are capable of rotating about fixed axes 26 and 27 supported by square bracket 2. The end of the short arms of levers 24 and 25 are provided with heelpieces 28 which bear against the rear side of slide 5, said heel-pieces 28 constitute bearing points a, a' against the rear of the slide 5 as indicated by arrows in Figure 1, and as shown in Figure 4.

Each end of rocking lever 21, is articulated to the long arm of bell-crank levers 29, 30 which are themselves capable of rotating about a fixed axis 31 supported by square bracket 2. The ends of the small arms of bell-crank levers 29 and 30 fit into slots cut in the shanks of bolts 32. The heads of said bolts are provided with clamps 33 which bear against rear face 34 of square bracket slide 7, as shown in Figure 4. In this way are obtained the two bearing points, indicated by arrows at c and c' in Fig. 1, between square brackets 2 and slide 7.

On square bracket 2 (Fig. 5) there is also mounted a contact device 51 comprising a contact 52 and a contact 53 which can be operated by means of cams 54 and 55 carried by a rod 56 mounted on an arm 57 which is connected to yoke 13 for upward and downward movements therewith. Contacts 52 and 53 make it possible to break the current supply circuit of motor 1 at the proper times as explained below.

Operation of the device described is as follows:

Clamping action is effected by the manipulation of a contact maker (which is not shown in the drawings) which locks the motor which causes the rise and fall of the horizontal arm and which, at the same time, starts the motor 1. By means of its threaded end 12, the rotation of spindle 9 by the motor 1 causes the rise of the nut of yoke 13 and at the same time, through gearing 35—36 causes the rotation of screw 37 in nut 38, which actions continue until the required stresses are applied first on the bearing point of rod 49 and next on the bearing points of levers 24, 25, 29 and 30. The magnitude of said stresses obviously corresponds to the mounting loads of springs 14 and 45.

When the springs 14 and 45 become loaded, yoke 13 can no longer continue its upward motion and if motor 1 were not stopped, spindle 9 would continue screwing into said yoke. To prevent this the cam 54 is located on rod 56 in such a manner that, at the moment under consideration, it actuates contact 52, thereby stopping motor 1. At this moment, springs 14 and 45 are additionally compressed by a small amount beyond their mounting load whereby the inertia torque of the rotor of motor is cancelled.

In this way the horizontal arm 3 is brought into alignment and tightened onto vertical pillar 4 at the bearing points b, a, a', c, c', which prevents any dropping of the end of arm 3, owing to the fact that any clearance between the horizontal arm and the vertical pillar has been eliminated. Tightening of the bearing points a, a', c, c', takes place in a uniform manner.

When it is again necessary to adjust the horizontal arm 3 along vertical pillar 4, it must be unclamped in order to reestablish, in a way, the clearance necessary for the sliding of said arm along the pillar. For this purpose a second contact maker (which is not shown in the drawings) is operated so as to start motor 1 in the opposite direction. The above described movements are then reproduced in reverse order until the unclamping of the five bearing points a, a', b, c, c', has been obtained. The effect of said movements in reverse order is to cause yoke 13 to move down and return to its original location and carry with it the rod 56. In this reverse operation contact 53 is actuated by cam 55 so as to switch off the current to the motor once release of the clamping has been obtained.

It should be noted that rocking levers 20 and 21 ensure the equality of the stresses on the bearing points of levers 24, 25 (which apply the horizontal arm against its guide 5) and on the bearing points of levers 29 and 30 (which apply square bracket 2 against its guide 7) all of which contributes to the uniformity of the tightening on bearing points a, a', c, c'.

It should likewise be noted (refer in particular to Fig. 3) that, at the top of the motor, spindle 9 is provided with a bolt head 58 capable of being operated by means of a wrench which makes it possible to carry out clamping and unclamping by hand.

As already stated, the magnitude of the gripping effect on bearing points a, a', b, c, c' depends fundamentally on the load capacities of springs 14 and 45. Nevertheless, it is possible to adjust the clamping action easily according to the requirements of the moment without dismantling the device either wholly or partly.

In order to effect the adjustment of the clamping action on bearing points a, a', b, c, c', the procedure is as follows:

For bearing points a, a', c, c', it is sufficient to adjust the lengths of links 17 (which have right hand threads at one end and left hand threads at the other end for this purpose). The length of links 17 can be adjusted, for instance, so that there shall be a clearance of .05 millimeter at bearing points a, a', c, c'.

As regards bearing point b it is sufficient to adjust the length of rod 44 so that there will be, for instance, a clearance of .05 millimeter between the outer edge of pillar 4 and heel-piece 50 of rod 49. The clearance between the inside edge of the pillar and the cross-piece in line with part 49 should not exceed .01 millimeter. Adjustment of the length of rod 44 is effected by means of a nut with double inverse tapping. The adjustment should be such that, when tightening up, bearing point b is clamped before bearing points a, a', c, c' become clamped.

In addition, the location of cam 54 is adjusted on the rod 56 so that the switching off of the motor can occur at the moment when spring 14 begins to contract. The contraction of the spring can be detected by observing the end of spindle 9 which protrudes from the top of the motor and which moves downwardly when the spring contracts.

Finally, the location of cam 55 is adjusted on the rod 56 so that the switching off of the motor can occur in such a time that the center of articulation of yoke 13 is offset by about 10 millimeters relatively to the straight line joining the centers of articulation of links 17 on rocking levers 20 and 21.

Prior to making any adjustment, care must be taken to make the rocking levers 20 and 21 butt against screws provided for that purpose on the upper wall of the square bracket and which are not shown in the drawings.

From the foregoing it will be seen that the clamping adjustment on bearing points a, a', b, c, c', can be carried out with the greatest facility and can be very readily modified whenever it becomes necessary.

The arrangement hereinbefore described and represented in the attached drawings has been given solely as an example; alterations may be made in details of embodiment without departing from the spirit and scope of the invention. Thus, in particular, the number and location of the bearing points provided according to the invention can differ from those indicated according to the type of machine to which the invention is applied.

What I claim is:

1. In a machine tool having a vertical column and a horizontal member slidably mounted on the front face and at least one side, means for clamping said member in a selected position on said column comprising clamping elements carried by said member and movable into and out of clamping engagement with side portions and with the back of said column, a rotatable shaft for actuating said elements, and equalizing means operatively interposed between said shaft and said clamping elements for equalizing the force with which said elements are clamped on said column.

2. In a machine tool having a vertical column and a horizontal member slidably mounted on at least two sides of said column, means for clamping said member in place on said column comprising clamping elements carried by said member and movable into and out of clamping engagement with said two sides of the column, a rotatable shaft for actuating said elements, and equalizing means including yieldable means operatively interposed between said shaft and said clamping elements for equalizing the force with which said elements are clamped on said column.

3. In a machine tool having a vertical column and a horizontal member slidably mounted on two sides and another face of said column, means for clamping portions of said member in place on said sides and said face of the column comprising clamping elements carried by said member and movable into and out of locking engagement with the said two sides and said face of said column, a rotatable shaft for actuating said elements, levers connected to said elements for actuation by said shaft, and spring means operatively interposed between said shaft and said levers in a manner to equalize the force with which said elements are clamped on said column.

4. In a machine tool having a vertical column and a horizontal member vertically slidably mounted on said column, means for clamping said horizontal member in place on said column comprising a plurality of clamping elements carried by said horizontal member and movable into and out of clamping engagement with said column, a rotatable shaft for actuating said elements, a motor for actuating said shaft, and yieldable means operatively interposed between said shaft and said elements for equalizing the force with which said elements are clamped on said column.

5. In a machine tool having a vertical column and a horizontal member vertically slidably mounted on said column, the combination of means for clamping said horizontal member on said column comprising clamping elements carried by said member for engagement with laterally spaced points on said column, a motor, a shaft driven by said motor, and means actuated by said shaft and connected to the clamping elements to move said clamping elements into and out of clamping engagement with said column.

6. In a machine tool having a vertical column and a horizontal member vertically and slidably mounted on said column, the combination of means for clamping said member on said column comprising clamping elements carried by said member for engagement with laterally spaced points on said column, a motor, a shaft driven by said motor and provided with threads, actuating means engaging the threads on said shaft, and means connected to said actuating means and to the clamping elements in a manner to produce movement of said clamping elements into and out of clamping engagement with said column on operation of said shaft in opposite directions by said motor.

7. In a machine tool having a vertical column and a horizontally extending member vertically slidably mounted on said column, the combination of means for clamping said horizontal member on said column comprising clamping elements carried by said member for engagement with spaced points on said column, a motor, a shaft rotated by said motor and provided with threads, actuating means engaging the threads on said shaft, means connected to said actuating means and to the clamping elements in a manner to produce movement of said clamping elements into and out of clamping engagement with said column on operation of said shaft in opposite directions by said motor, and spring means operatively interposed between said actuating means and said clamping elements in a manner to equalize the force with which said clamping elements are clamped against said column.

8. In a machine tool having a vertical column and a horizontally extending member vertically slidably mounted on said column, the combination of means for clamping said horizontal member on said column comprising clamping elements carried by said horizontal member for engagement with spaced points on said column, a motor, a threaded shaft rotated by said motor, actuating means engaging the threads on said shaft and movable axially along said shaft as the shaft is rotated, lever means responsive to axial movement of said actuating means and connected to said clamping elements in a manner to move them into and out of clamping engagement with said column, and means for equalizing the force with which said clamping elements are clamped on said column.

9. In a machine tool having a vertical column and a horizontally extending member vertically slidably mounted on said column, the combination of means for clamping said member on said column comprising clamping elements carried by said member and engageable with spaced points on said column, a motor, a threaded shaft rotated by said motor, actuating means engaging the threads on said shaft and movable axially of the shaft as the shaft is rotated, a lever responsive to axial movement of said actuating means and connected to said clamping elements in a manner to move said clamping elements into and out of clamping engagement with said column, and spring means operatively interposed between said shaft and said clamping elements and arranged to be stressed by movement of said actuating means in a direction to clamp the said clamping elements on said column.

10. In a machine tool having a vertical column and a horizontally extending member, vertically slidably mounted on said column, means for clamping said member on said column comprising a plurality of clamping elements carried by said member including at least two clamping elements for engagement with two laterally spaced points on said column, a rotatable shaft for actuating said clamping elements into and out of clamping engagement with said column, means actuated by said shaft for moving certain of said clamping elements into engagement with said column in advance of others of said clamping elements, and means for equalizing the force with which said elements are engaged with said column.

11. In a machine tool having a vertical column and a horizontally extending member vertically slidably mounted on said column, clamping elements carried by said member for gripping several different sides of said column to clamp said horizontal member thereagainst, a reversible motor, actuating means driven by said motor and operatively connected to said clamping elements for moving them into and out of clamping engagement with said sides of the column, and means responsive to movement of said actuating means for controlling the direction of operation of said motor for a subsequent movement of said actuating means.

12. In a machine tool of the type having a vertical column and a horizontal arm vertically slidably mounted thereon, means for horizontalizing said arm and clamping the same in horizontal position on said column by eliminating clearance between the arm and the points on the column engaged thereby, said means comprising gripping means carried by said arm for clampably engaging portions on two opposite sides and a third side of said column, the point of engagement of said gripping means with the third side of the column being located above the lowest point of engagement of said gripping means with either of said opposite sides of the column, and actuating means arranged to move said gripping means into and out of clamping engagement with the column, with the third side engaging portion of said gripping means reaching effective clamping engagement with the column in advance of the column side engaging portions of said gripping means, whereby said arm is rocked on the column to horizontal position in advance of the arm being clamped against the said column.

13. In a machine tool of the type having a vertical column and a horizontal arm vertically slidably mounted thereon, means for horizontalizing said arm and clamping the same in horizontal position on said column by eliminating clearance between the arm and the points on the column engaged thereby, said means comprising gripping means carried by said arm for clampably engaging portions on two opposite sides and a third side of said column, the point of engagement of said gripping means with the third side of the column being located above the lowest point of engagement of said gripping means with either of said opposite sides of the column, and actuating means arranged to move said gripping means into and out of clamping engagement with the column, with the third side engaging portion of said gripping means reaching effective clamping engagement with the column in advance of the column side engaging portions of said gripping means, whereby said arm is rocked on the column to horizontal position in advance of the arm being clamped against the said column, said gripping means comprising gripping elements for gripping at least two vertically spaced points on each of the two opposite sides of the column, said gripping means further comprising at least one gripping element for gripping at least one point on said third side of the column.

14. In a machine tool of the type having a vertical column and a horizontal arm vertically slidably mounted thereon, means for horizontalizing said arm and clamping the same in horizontal position on said column by eliminating clearance between the arm and the points on the column engaged thereby, said means comprising gripping means carried by said arm for clampably engaging portions on two opposite sides and a third side of said column, the point of engagement of said gripping means with the third side of the column being located above the lowest point of engagement of said gripping means with either of said opposite sides of the column, and actuating means arranged to move said gripping means into and out of clamping engagement with the column, with the third side engaging portion of said gripping means reaching effective clamping engagement with the column in advance of the column side engaging portions of said gripping means, whereby said arm is rocked on the column to horizontal position in advance of the arm being clamped against the said column, said gripping means comprising gripping elements for gripping at least two vertically spaced points on each of the two opposite sides of the column, said gripping means further comprising at least one gripping element for gripping at least one point on said third side of the column, and equalizing means operatively connected between the several gripping elements and equalizing the gripping pressure thereof.

15. In a machine tool of the type involving a vertical column and a horizontal arm slidably mounted on at least two laterally spaced slideways on the front of the column and at least one slideway at the rear of the column, means for horizontalizing said arm and clamping the same in horizontal position on said column, said means comprising first and second sets of levers pivoted on the arm to engage the slideways at the sides of the column, and a heel-piece movably mounted on the arm for engaging the slideway at the rear of the column, and actuating means operatively connected with said first and second sets of levers and with said heel-piece for operating the levers and the heel-piece into and out of gripping engagement with their related slideways.

16. In a machine tool of the type involving a vertical column and a horizontal arm slidably mounted on at least two laterally spaced slideways on the front of the column and at least one slideway at the rear of the column, means for horizontalzing said arm and clamping the same in horizontal position on said column, said means comprising first and second sets of levers pivoted on the arm to engage the slideways at the sides of the column, and a heel-piece movably mounted on the arm for engaging the slideway at the rear of the column, and actuating means operatively connected with said first and second sets of levers and with said heel-piece for operating the levers and the heel-piece into and out of gripping engagement with their related slideways, said sets of levers each comprising at least two vertically spaced levers arranged to engage the related, slideways at vertically spaced points.

17. In a machine tool of the type involving a vertical column and a horizontal arm slidably mounted on at least two laterally spaced slideways on the front of the column and at least one slideway at the rear of the column, means for horizontalizing said arm and clamping the same in horizontal position on said column, said means comprising first and second sets of levers pivoted on the arm to engage the slideways at the sides of the column, and a heel-piece movably mounted on the arm for engaging the slideway at the rear of the column, and actuating means operatively connected with said first and second sets of levers and with said heel-piece for operating the levers and the heel-piece into and out of gripping engagement with their related slideways, and equalizing means effectively connected between said actuating means and said first and second sets of levers and said heel-piece for equalizing the force of engagement of said levers and the heel-piece and their related slideways.

18. In a machine tool of the type involving a vertical column and a horizontal arm slidably mounted on at least two laterally spaced slideways on the front of the column and at least one slideway at the rear of the column, means for horizontalizing said arm and clamping the same in horizontal position on said column, said means comprising first and second sets of levers pivoted on the arm to engage the slideways at the sides of the column, and a heel-piece movably mounted on the arm for engaging the slideway at the rear of the column, and actuating means operatively connected with said first and second sets of levers and with said heel-piece for operating the levers and the heel-piece into and out of gripping engagement with their related slideways, and equalizing means effectively connected between said actuating means and said first and second sets of levers and said heel-piece for equalizing the force of engagement of said levers and the heel-piece with their related slideways, said equalizing means including means effective to effectively engage said heel-piece with its slideway in advance of effective engagement of said first and second sets of levers with their related slideways, whereby the horizontal arm is drawn up to horizontal relation to the column from a declining position in advance of being clamped to the column in horizontal relation thereto by the effective engagement of both the sets of levers and the heel-piece.

19. In a machine tool having a vertical column and a horizontally extending member vertically slidably mounted on said column, clamping elements carried by said member for clamping said horizontal member in position on said column, a reversible motor, actuating means driven by said motor and operatively connected to said clamping elements for moving the clamping elements into and out of clamping engagement with said column, means for equalizing the force with which said clamping elements are engaged with said column, and means responsive to movement of said actuating means for controlling the direction of operation of said motor for producing a subsequent movement of said actuating means.

20. In a machine tool having a vertical column and a horizontal member vertically slidably mounted on said column, the combination of clamping elements carried by said member for clamping said horizontal member in position on said column, a motor having a rotating element, means operatively connecting said motor element to said clamping elements for moving said clamping elements into and out of clamping engagement with said column upon rotation of said motor element, and yieldable means interposed between said motor element and said connecting means to permit said motor element to continue to rotate to a limited degree after said clamping elements are brought into clamping engagement with said column by the rotation of said motor element.

CHARLES WILLIAM BERTHIEZ.